Aug. 23, 1927. 1,639,777
O. J. LEWIS
CULTIVATOR ATTACHMENT
Filed Oct. 21, 1926 2 Sheets-Sheet 1
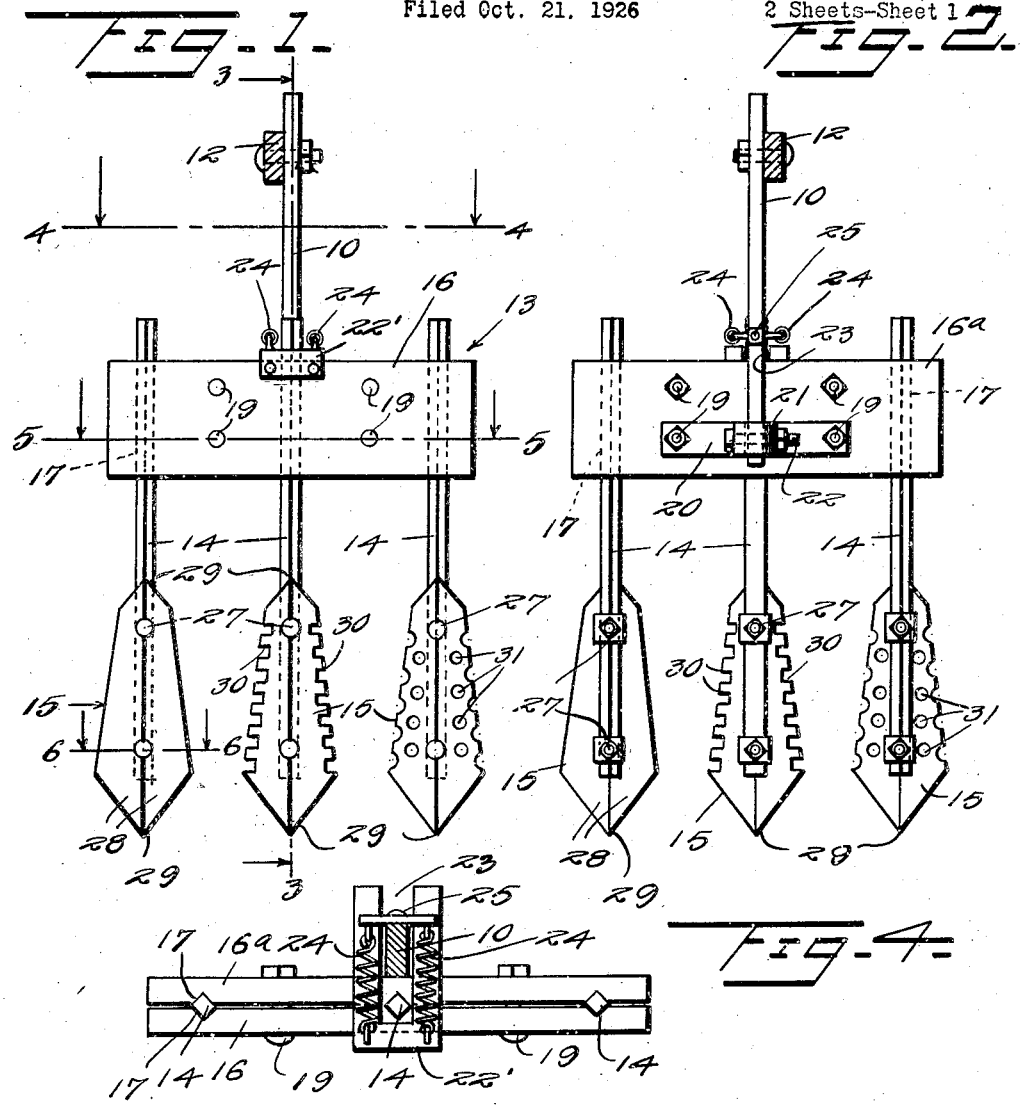
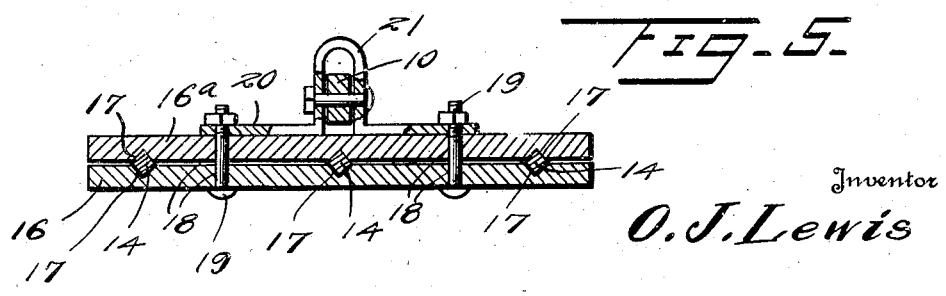
Inventor
O. J. Lewis
By Watson E. Coleman
Attorney Aug. 23, 1927.
O. J. LEWIS
1,639,777
CULTIVATOR ATTACHMENT
Filed Oct. 21, 1926
2 Sheets-Sheet 2
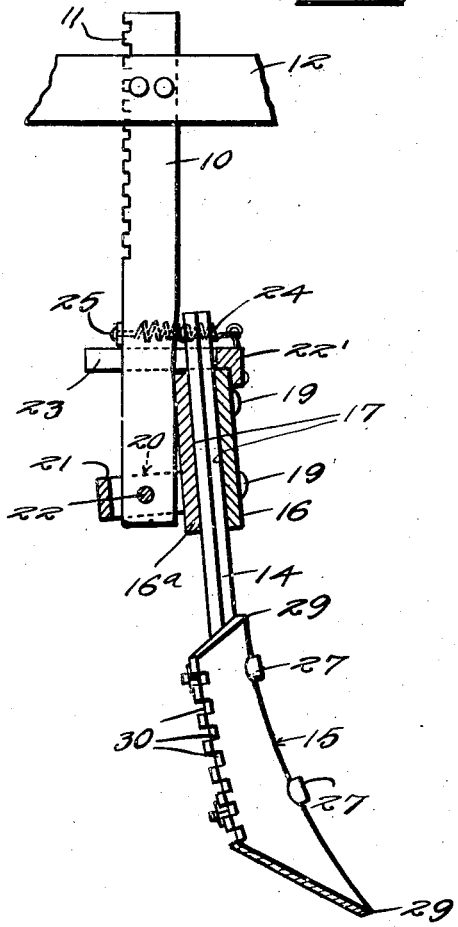
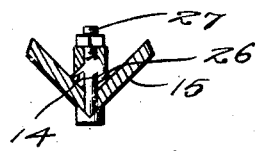
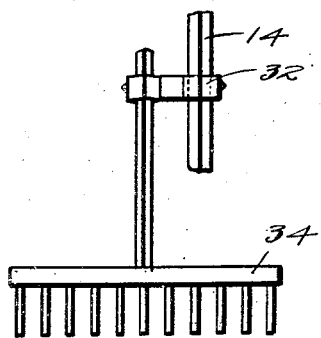
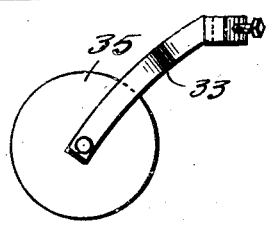
Inventor
O. J. Lewis
By Watson E. Coleman
Attorney Patented Aug. 23, 1927.

1,639,777

UNITED STATES PATENT OFFICE.

OSCAR J. LEWIS, OF CANTON, ILLINOIS.

CULTIVATOR ATTACHMENT.

Application filed October 21, 1926. Serial No. 143,233.

This invention relates to a combined cultivating and mulching attachment for cultivators and more particularly to a device providing an adjustable shovel mounting for use in this connection.

An important object of the invention is to provide a construction such that the shovels are readily adjustable to regulate the depth of their engagement while, at the same time, means are provided for permitting these shovels to yield in event they come into engagement with any solid obstruction.

A further object of the invention is to provide a novel and improved shovel construction for use in this connection.

A still further object of the invention is to provide a construction of this character in which the shovels and tines are so formed that they will not sever small weed or plant roots with which they come into contact, but will draw these roots from the ground, causing them to lay upon the top of the soil.

A still further object of the invention is to provide a construction of this character in which the shovels are so spaced and formed that they will not form deep depressions or furrows in the soil which will act as rain troughs or gutters carrying away rainfall.

These and other objects I attain by the construction shown in the accompanying drawings, wherein for the purpose of illustration is shown a preferred embodiment of my invention and wherein:—

Figure 1 is a front elevation of cultivating and mulching attachments constructed in accordance with my invention;

Figure 2 is a rear elevation thereof;

Figure 3 is a vertical sectional view therethrough on the line 3—3 of Figure 1;

Figure 4 is a section on the line 4—4 of Figure 1;

Figure 5 is a section on the line 5—5 of Figure 1;

Figure 6 is a section on the line 6—6 of Figure 1;

Figure 7 is a fragmentary elevation showing the manner of attaching a rake to one of the tines;

Figure 8 is a plan view of the bracket employed for this purpose;

Figure 9 is a side elevation of a disk attachment which may be employed on the tines instead of the shares 15.

Referring now more particularly to the drawings, the numeral 10 generally designates a gang brace or standard adapted at its upper end, as at 11, for adjustable connection with a frame bar 12 of a cultivator. Carried by the lower end of the standard 10 is a tine holder 13 providing an adjustable mounting for tines 14 to the lower ends of which the shovels 15 may be secured.

The tine holder 13 comprises front and rear plates 16 and 16ª, each having formed therein a plurality of parallel V-shaped gooves 17 which, in the assembled relation of the plates, combine to produce rectangular openings for the reception of the rectangular tiines 14. Between adjacent grooves 17, the plates have openings 18 for the passage of bolts 19, by means of which the plates may be drawn together to clamp upon the upper ends of the tines. The rear plate 16ª is provided upon its rear face with a yoke 20 having a central bowed portion 21 through which the lower end of the standard 10 may be directed. Through the arms of the yoke and the standard, a king bolt 22 is directed, so that the tine holder may have pivotal movement with relation to the standard. To the front plate 16 is secured a guide 22' which extends rearwardly from the front plate at the upper edge thereof and has a slot 23 within which the standard 10 may operate. To this front plate at opposite sides of the standard are secured the forward ends of springs 24, the rear ends of which are connected to the standard, as at 25, and serve to constantly hold the standard in engagement with the rear face of the plate 16ª at the upper end thereof.

The lower ends of the tines 14 are slightly arcuately curved and are provided with openings 26 for the passage of securing elements 27 affording a means for securing to these tines the shovels 15. Each shovel 15 has a similar longitudinal curvature and has angularly related side faces 28, the rear faces of which closely fit against the surface of the tine. Each end edge of the shovel tapers to a point 29 and the body portion of the shovel tapers from end to end, so that the shovel is provided with one relatively broad and one relatively narrow point which may be interchangeably employed, as desired. The side edges of the plate may be serrated, as at 30, and, if dseired, the body of the plate may be perforated, as at 31, to provide for an extensive breaking of the soil which engages against the shovel to thereby permit the device to be employed in the mulching operation. If desired, attachments 32 and 33 may be provided for the tines permitting connection therewith of a rake 34 or disk 35.

It will be obvious that in operation, the angle square of the tines coming in contact with any roots contained in the soil being worked will not break or cut the same, but will merely lift them from the soil until they slip off the tines, at which time they will be disposed upon the upper surface of the ground where they can be readily removed or where, being subjected to the action of the sun, they will soon wither and die. The shovel having the same angle operates in exactly the same manner. The tines being very narrow, leave no furrow or rain trough which will permit surface water to furrow the ground and thus permits the formation of a substantially permanent top mulch which will not bake or cake so hard or as quickly as soil which has been worked with the ordinary cultivator attachment. A cultivator of this construction is particularly adapted for use with crops planted in rows, such as corn, cotton, potatoes, sugar beets and substantially all garden crops.

Since the construction hereinbefore set forth is capable of a certain range of change and modification without materially departing from the spirit of the invention, I do not limit myself to such specific structure except as hereinafter claimed.

I claim:—

1. In an attachment for cultivators, a standard having means whereby it may be vertically adjustably connected with the frame bar of a cultivator, a transversely extending tine support pivotally connected at its rear face in spaced relation to its upper edge with the lower end of the standard and a spring connection between the upper edge of the tine support and standard normally maintaining said upper edge in engagement with the standard, a guide secured to the tine support and extending rearwardly therefrom, said guide having a slot within which said standard operates.

2. In an attachment for cultivators, a standard having means whereby it may be vertically adjustably connected with the frame bar of a cultivator, a transversely extending tine support pivotally connected at its rear face in spaced relation to its upper edge with the lower end of the standard, a spring connection between the upper edge of the tine support and standard normally maintaining said upper edge in engagement with the standard, said tine support comprising front and rear plates and means for securing said plates in assembled relation, adjacent faces of the plates having vertically extending grooves combining in the assembled relation of the plate to produce rectangular openings and tines rectangular in cross section having their upper ends disposed in said bores.

In testimony whereof I hereunto affix my signature.

OSCAR J. LEWIS.